(12) United States Patent
Penfield et al.

(10) Patent No.: US 12,602,952 B2
(45) Date of Patent: Apr. 14, 2026

(54) IMAGE-BASED AUTOMATED ERGONOMIC RISK ROOT CAUSE AND SOLUTION IDENTIFICATION SYSTEM AND METHOD

(71) Applicant: VelocityEHS Holdings, Inc., Chicago, IL (US)

(72) Inventors: Julia Penfield, Seattle, WA (US); Gunwoo Yong, Ann Arbor, MI (US); Meiyin Liu, New Brunswick, NJ (US); SangHyun Lee, Ann Arbor, MI (US)

(73) Assignee: VelocityEHS Holdings, Inc., Chicago, IL (US)

( * ) Notice: Subject to any disclaimer, the term of this patent is extended or adjusted under 35 U.S.C. 154(b) by 6 days.

(21) Appl. No.: 18/742,633

(22) Filed: Jun. 13, 2024

(65) Prior Publication Data

US 2025/0191406 A1 Jun. 12, 2025

Related U.S. Application Data

(63) Continuation of application No. 18/535,146, filed on Dec. 11, 2023, now Pat. No. 12,014,575.

(51) Int. Cl.
G06V 40/20 (2022.01)
G06V 10/82 (2022.01)

(52) U.S. Cl.
CPC .............. G06V 40/23 (2022.01); G06V 10/82 (2022.01)

(58) Field of Classification Search
None
See application file for complete search history.

(56) References Cited

U.S. PATENT DOCUMENTS

| | | | | |
|---|---|---|---|---|
| 9,099,152 | B2 * | 8/2015 | Marcus | .............. H04N 21/4182 |
| 11,763,235 | B1 * | 9/2023 | Penfield | ............. G06Q 10/0635 |
| | | | | 704/9 |
| 11,847,600 | B1 * | 12/2023 | Penfield | ................. G06F 40/30 |

(Continued)

FOREIGN PATENT DOCUMENTS

WO 2023059699 A1 4/2023

OTHER PUBLICATIONS

Automatic Ergonomic Risk Assessment Using a Variational Deep Network Architecture. Chatzis et al. (Year: 2022).*

(Continued)

*Primary Examiner* — Delomia L Gilliard
(74) *Attorney, Agent, or Firm* — K&L Gates LLP

(57) ABSTRACT

Disclosed herein is an image-based system configured to identify root causes of industrial ergonomic risks and their corresponding solutions. An example system comprises a computing device configured to encode an image of a worker performing a work task to generate an embedding vector, transmit the embedding vector to an image-grounded text decoder, while generating first tokens to instruct the decoder to generate a first sentence indicating a root cause of an ergonomic risk identified in the image, compute first relative sensitivity scores relating to the first tokens and extracted image features, generate second tokens of the first sentence based on the first relative sensitivity scores, while generating third tokens to instruct a text decoder to generate a second sentence indicating a solution to the ergonomic risk, calculate second relative sensitivity scores relating to the second and third tokens, and generate the first and second sentences accordingly.

20 Claims, 11 Drawing Sheets

(56)  References Cited

U.S. PATENT DOCUMENTS

| | | | | |
|---|---|---|---|---|
| 12,112,537 | B2 * | 10/2024 | Tran | G06F 16/535 |
| 12,153,778 | B2 * | 11/2024 | Davidson | G06F 9/451 |
| 12,417,079 | B2 * | 9/2025 | Ross | G06F 8/33 |
| 2016/0148132 | A1 * | 5/2016 | Aqlan | G06Q 10/0635 |
| | | | | 705/7.16 |
| 2018/0329892 | A1 * | 11/2018 | Lubbers | G06V 10/764 |
| 2020/0257437 | A1 * | 8/2020 | Fitzpatrick | G06F 3/0486 |
| 2020/0273580 | A1 * | 8/2020 | Kaszuba | G06V 10/82 |
| 2020/0311798 | A1 * | 10/2020 | Forsyth | G06N 3/04 |
| 2020/0327465 | A1 * | 10/2020 | Baek | G06N 3/08 |
| 2022/0012544 | A1 * | 1/2022 | Zhao | G06N 3/045 |
| 2022/0237368 | A1 * | 7/2022 | Tran | G06F 21/32 |
| 2022/0293272 | A1 * | 9/2022 | Pang | G16H 20/00 |
| 2023/0015606 | A1 * | 1/2023 | Liu | G06F 40/295 |
| 2023/0237773 | A1 * | 7/2023 | Li | G06F 40/126 |
| | | | | 382/155 |
| 2023/0245651 | A1 * | 8/2023 | Wang | G06N 5/022 |
| | | | | 704/275 |
| 2023/0252224 | A1 * | 8/2023 | Tran | G06F 40/56 |
| | | | | 715/256 |
| 2023/0274420 | A1 * | 8/2023 | Seah | G06N 3/096 |
| | | | | 382/128 |
| 2023/0351102 | A1 * | 11/2023 | Tran | G06N 3/0895 |
| 2024/0037627 | A1 * | 2/2024 | Dodds | G06Q 30/0643 |
| 2024/0037822 | A1 * | 2/2024 | Aberman | G06N 3/096 |
| 2024/0419725 | A1 * | 12/2024 | Li | G06F 16/353 |
| 2024/0428163 | A1 * | 12/2024 | Penfield | G06F 40/205 |
| 2025/0054238 | A1 * | 2/2025 | Lu | G06F 18/00 |
| 2025/0095393 | A1 * | 3/2025 | Yang | G06F 40/205 |
| 2025/0239094 | A1 * | 7/2025 | Wu | G06V 10/26 |

OTHER PUBLICATIONS

Using Neural Encoder-Decoder Models With Continuous Outputs for Remote Sensing Image Captioning. Ramos et al. (Year: 2022).*

Chatzis et al., Automatic Ergonomic Risk Assessment Using a Variational Deep Network Architecture. 2022.

Ramos et al., Using Neural Encoder-Decoder Models With Continuous Outputs for Remote Sensing Image Captioning.. 2022.

Selvam et al., A Transformer-Based Framework for Scene Text Recognition. 2022.

Ulusoy et al., Improving Image Captioning with Language Modeling Regularizations. 2019.

Wu et al, Visual Transformers: Token-based Image Representation and Processing for Computer Vision. 2020.

* cited by examiner

| Problem-Solution Pair | | Ergonomic Problem and Solution |
|---|---|---|
| Problem-Solution 1 | Problem | Bending forward to tie rebars at ground level can cause lower back pain. |
| | Solution | Use a rebar-tying tool with extension handle. |
| Problem-Solution 2 | Problem | Squatting for rebar tying at ground level can be painful to the knees. |
| | Solution | Use a rebar-tying tool with extension handle. |
| Problem-Solution 3 | Problem | Drilling overhead with arms raised can damage the shoulders. |
| | Solution | Use a bit extension shaft. |
| Problem-Solution 4 | Problem | Handling a bulky window can put stress on shoulders. |
| | Solution | Use vacuum lifters. |
| Problem-Solution 5 | Problem | Hand-held power tools produced a lot of vibration can hurt hands. |
| | Solution | Use reduced vibration power tools. |

| Problem-Solution Pair | # collected images from YouTube | # collected images from other websites | # augmented images | # collected captions | # augmented captions |
|---|---|---|---|---|---|
| Problem-Solution 1 | 439 | 68 | 61 | 6 | 154 |
| Problem-Solution 2 | 255 | 64 | 245 | 6 | 141 |
| Problem-Solution 3 | 647 | 39 | - | 6 | 172 |
| Problem-Solution 4 | 522 | 29 | - | 6 | 162 |
| Problem-Solution 5 | 736 | 22 | - | 6 | 152 |
| Sum | 2,599 | 222 | 306 | 30 | 781 |

FIG. 5

| Problem-Solution Pair | Training dataset | | Testing dataset | |
|---|---|---|---|---|
| | # training images | # training captions | # testing images | # ground-truth captions per image |
| Problem-Solution 1 | 500 | 500 | 68 | 160 |
| Problem-Solution 2 | 500 | 500 | 64 | 147 |
| Problem-Solution 3 | 500 | 500 | 39 | 178 |
| Problem-Solution 4 | 500 | 500 | 29 | 168 |
| Problem-Solution 5 | 500 | 500 | 22 | 158 |
| Sum | 2,500 | 2,500 | 222 | 811 |

FIG. 8

| Hyperparameters | Present Disclosure | BLIP | CNN-LSTM |
|---|---|---|---|
| Batch size | 8 | 5 | 8 |
| Epochs | 20 | 20 | 20 |
| Optimizer | AdamW | AdamW | Adam |
| Learning rate | 0.00005 | 0.00005 | 0.001 |
| Embedding size | - | - | 256 |
| Hidden state size | - | - | 512 |

FIG. 9

| Models | BLEU 1 | BLEU 2 | BLEU 3 | BLEU 4 |
|---|---|---|---|---|
| CNN-LSTM | 0.799 | 0.698 | 0.611 | 0.558 |
| BLIP | 0.884 | 0.834 | 0.794 | 0.761 |
| Present Disclosure | 0.942 | 0.886 | 0.842 | 0.796 |

Holding a window that is too heavy can cause the shoulders to become damaged and strained. Use vacuum lifters.

Raising the arms to drill overhead can be harmful to the shoulders. Use a bit extension shaft.

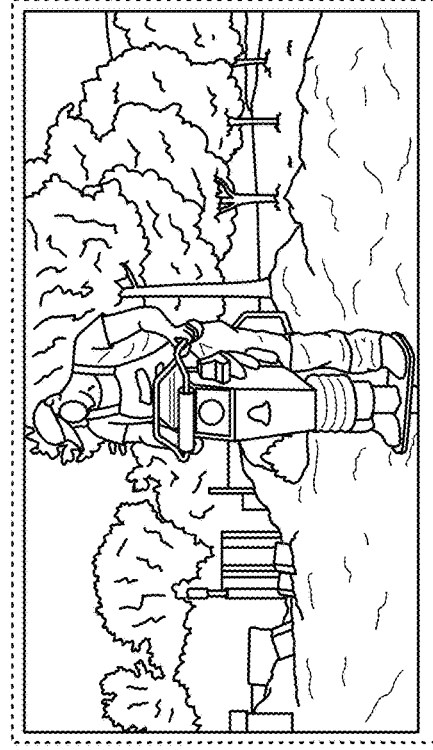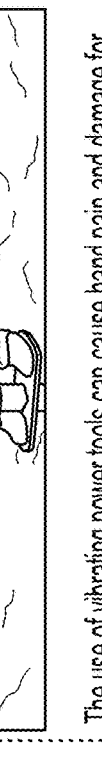

The use of vibrating power tools can cause hand pain and damage for workers. Use reduced vibration power tools.

FIG. 15

Bending forward to tie rebars located near the feet may cause discomfort in the lower back. Use a rebar tying tool with extension handle.

FIG. 16

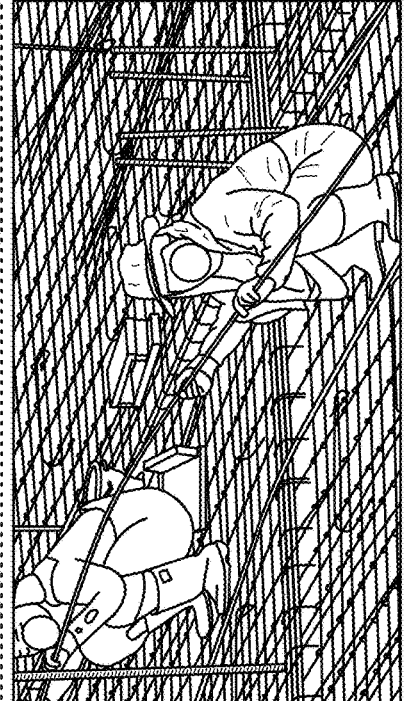

Squatting to reach and tie rebars at lower levels can cause knee soreness. Use a rebar tying tool with extension handle.

FIG. 14

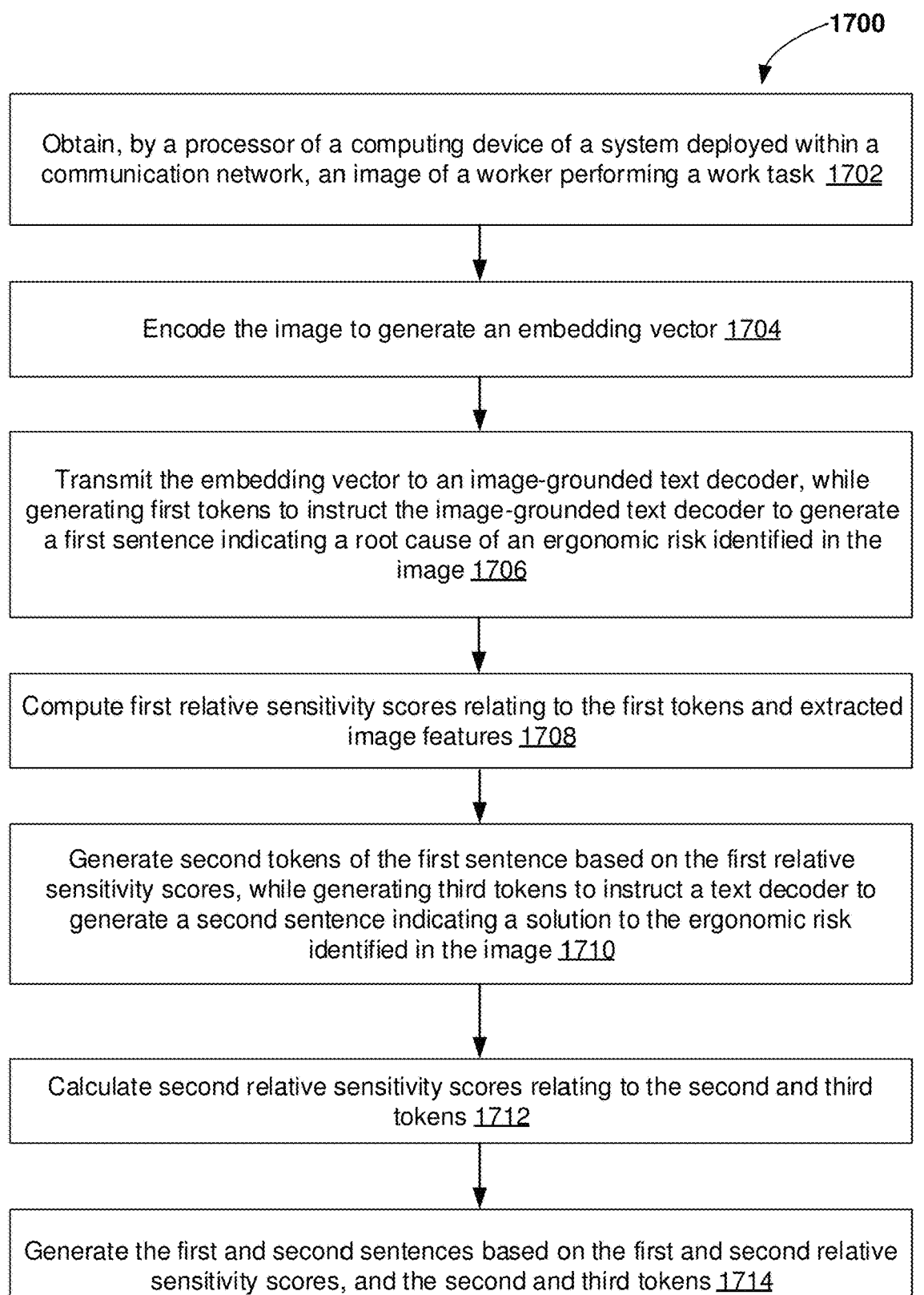

1700

Obtain, by a processor of a computing device of a system deployed within a communication network, an image of a worker performing a work task 1702

Encode the image to generate an embedding vector 1704

Transmit the embedding vector to an image-grounded text decoder, while generating first tokens to instruct the image-grounded text decoder to generate a first sentence indicating a root cause of an ergonomic risk identified in the image 1706

Compute first relative sensitivity scores relating to the first tokens and extracted image features 1708

Generate second tokens of the first sentence based on the first relative sensitivity scores, while generating third tokens to instruct a text decoder to generate a second sentence indicating a solution to the ergonomic risk identified in the image 1710

Calculate second relative sensitivity scores relating to the second and third tokens 1712

Generate the first and second sentences based on the first and second relative sensitivity scores, and the second and third tokens 1714

FIG. 17

IMAGE-BASED AUTOMATED ERGONOMIC RISK ROOT CAUSE AND SOLUTION IDENTIFICATION SYSTEM AND METHOD

CROSS-REFERENCES TO RELATED APPLICATION

This application is a continuation of U.S. patent application Ser. No. 18/535,146, filed Dec. 11, 2023, now U.S. Pat. No. 12,014,575, entitled "IMAGE-BASED AUTOMATED ERGONOMIC RISK ROOT CAUSE AND SOLUTION IDENTIFICATION SYSTEM AND METHOD," which is hereby incorporated by reference in its entirety.

FIELD OF TECHNOLOGY

The present disclosure generally relates to identifying ergonomic risk root causes at workplaces, and more particularly relates to image-based methods and systems configured to identify industrial ergonomics risks and solutions.

BACKGROUND

Workers across diverse industries such as manufacturing, transportation, and construction have faced a variety of ergonomic risk factors, including awkward postures, repetitions, and vibrations. This has led to a significant occurrence of work-related musculoskeletal disorders (WMSDs). WMSDs are the leading cause of non-fatal injuries, jeopardizing workers' health. In addition, the estimated annual economic burden of WMSDs, as measured by compensation costs, lost wages, and lost productivity, is approximately $50 billion on average annually (National Research Council 2001). To prevent WMSDs, it is crucial to pinpoint the root cause of ergonomic risks and provide corresponding solutions, which requires expertise in ergonomics. Typically, ergonomic experts would be required to visit workplaces in person or review videos of workers' tasks. However, it may be impossible to identify the root cause of ergonomic risks and their corresponding solutions for all workplaces. Indeed, there are over 100 million workers in the United States, while there are fewer than 5,000 members of the Human Factors and Ergonomics Society, and fewer than 2,000 members among them are certified professional ergonomists who specialize in ergonomics.

Consequently, many workplaces still face challenges in identifying the root causes of ergonomic risks and their corresponding solutions.

Accordingly, there is a need for automatically identifying root causes of industrial ergonomic risks and their corresponding solutions using advanced computer vision and natural language processing, especially solely from images.

SUMMARY

Among other features, the present disclosure provides a system including a computing device comprising: a non-transitory computer-readable storage medium storing machine readable instructions, and a processor coupled to the non-transitory computer-readable storage medium and configured to execute the machine readable instructions to: obtain an image of a worker performing a work task, encode the image to generate an embedding vector, transmit the embedding vector to an image-grounded text decoder, while generating first tokens to instruct the image-grounded text decoder to generate a first sentence indicating a root cause of an ergonomic risk identified in the image, compute first relative sensitivity scores relating to the first tokens and extracted image features, generate second tokens of the first sentence based on the first relative sensitivity scores, while generating third tokens to instruct a text decoder to generate a second sentence indicating a solution to the ergonomic risk identified in the image, calculate second relative sensitivity scores relating to the second and third tokens, and generate the first and second sentences based on the first and second relative sensitivity scores, and the second and third tokens.

In one embodiment, the processor may be configured to execute the machine readable instructions to encode the image to generate the embedding vector by partitioning the image into a plurality of sub-images via a vision transformer of the image encoder; encoding the plurality of sub-images as a sequence of embeddings to represent a global image feature; and generating the embedding vector based on the sequence of embeddings.

In another embodiment, the processor may be configured to execute the machine readable instructions to compute the first relative sensitivity scores using causal self-attention layers and cross attention layers of the image-grounded text decoder.

Further, the processor may be configured to execute the machine readable instructions to process the first relative sensitivity scores using feed-forward networks followed by a linear transformation and a SoftMax function to generate the second tokens.

In some implementations, the processor may be configured to execute the machine readable instructions to calculate the second relative sensitivity scores using multi-head attention layers of a text encoder and a text decoder. An output of the multi-head attention layers may be processed using feed-forward networks followed by a linear transformation and a SoftMax function of the text decoder.

In yet another embodiment, the processor may be configured to execute the machine readable instructions to identify 2D or 3D body joint locations and corresponding ergonomic risk scores to determine pose information based on the image.

In accordance with other aspects, the present disclosure relates to a computer-implemented method performed by a computing server system, the computer-implemented method comprising: obtaining, by a processor of the computing server system, an image of a worker performing a work task; encoding the image to generate an embedding vector; transmitting the embedding vector to an image-grounded text decoder, while generating first tokens to instruct the image-grounded text decoder to generate a first sentence indicating a root cause of an ergonomic risk identified in the image; computing first relative sensitivity scores relating to the first tokens and extracted image features; generating second tokens of the first sentence based on the first relative sensitivity scores, while generating third tokens to instruct a text decoder to generate a second sentence indicating a solution to the ergonomic risk identified in the image; calculating second relative sensitivity scores relating to the second and third tokens; and generating the first and second sentences based on the first and second relative sensitivity scores, and the second and third tokens.

In one embodiment, the encoding the image to generate the embedding vector of the method may comprise: partitioning the image into a plurality of sub-images using a vision transformer of the image encoder; encoding the plurality of sub-images as a sequence of embeddings to represent a global image feature; and generating the embedding vector based on the sequence of embeddings.

For example, the computing the first relative sensitivity scores may be performed using causal self-attention layers and cross attention layers of the image-grounded text decoder.

The method may further comprise processing the first relative sensitivity scores using feed-forward networks followed by a linear transformation and a SoftMax function in order to generate the second tokens. The calculating the second relative sensitivity scores may be performed using multi-head attention layers of a text encoder and a text decoder. The method may further comprise processing an output of the multi-head attention layers using feed-forward networks followed by a linear transformation and a SoftMax function of the text decoder.

In some embodiments, the method may further comprise identifying 2D or 3D body joint locations and corresponding ergonomic risk scores to determine pose information based on the image.

In accordance with additional aspects, the present disclosure relates to non-transitory computer readable medium storing machine executable instructions for a computing server system, the machine executable instructions being configured for: obtaining, by a processor of the computing server system, an image of a worker performing a work task; encoding the image to generate an embedding vector; transmitting the embedding vector to an image-grounded text decoder, while generating first tokens to instruct the image-grounded text decoder to generate a first sentence indicating a root cause of an ergonomic risk identified in the image; computing first relative sensitivity scores relating to the first tokens and extracted image features; generating second tokens of the first sentence based on the first relative sensitivity scores, while generating third tokens to instruct a text decoder to generate a second sentence indicating a solution to the ergonomic risk identified in the image; calculating second relative sensitivity scores relating to the second and third tokens; and generating the first and second sentences based on the first and second relative sensitivity scores, and the second and third tokens.

In one embodiment, the instructions for encoding the image to generate the embedding vector may further comprise instructions for: partitioning the image into a plurality of sub-images using a vision transformer of the image encoder; encoding the plurality of sub-images as a sequence of embeddings to represent a global image feature; and generating the embedding vector based on the sequence of embeddings.

In another embodiment, the computing the first relative sensitivity scores may be performed using causal self-attention layers and cross attention layers of the image-grounded text decoder.

Further, the non-transitory computer readable medium may further comprise instructions for processing the first relative sensitivity scores using feed-forward networks followed by a linear transformation and a SoftMax function in order to generate the second tokens.

The calculating the second relative sensitivity scores may be performed using multi-head attention layers of a text encoder and a text decoder, and the non-transitory computer readable medium may further comprise instructions for processing an output of the multi-head attention layers using feed-forward networks followed by a linear transformation and a SoftMax function of the text decoder.

In some embodiments, the non-transitory computer readable medium may further comprise instructions for identifying 2D or 3D body joint locations and corresponding ergonomic risk scores to determine pose information based on the image.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 illustrates five selected different ergonomic problem-solution pairs, according to an exemplary aspect;

FIG. 5 illustrates images and captions relating to the five selected different ergonomic problem-solution pairs of FIG. 4 that are collected and augmented by the system of FIG. 1, according to an exemplary aspect;

FIG. 8 illustrates training and testing datasets used by the system of FIG. 1, according to an exemplary aspect;

FIG. 9 illustrates hyper-parameter settings for a number of DL models, according to an exemplary aspect;

FIG. 14 illustrates a third example of ergonomic problems and solutions correctly identified by the system of FIG. 1, according to an exemplary aspect;

FIG. 15 illustrates a fourth example of ergonomic problems and solutions correctly identified by the system of FIG. 1, according to an exemplary aspect;

FIG. 16 illustrates a fifth example of ergonomic problems and solutions correctly identified by the system of FIG. 1, according to an exemplary aspect; and FIG. 17 illustrates a flowchart of an image-based computer implemented method for identifying industrial ergonomics risks and their solutions, according to an exemplary aspect.

DETAILED DESCRIPTION

Figure 1:
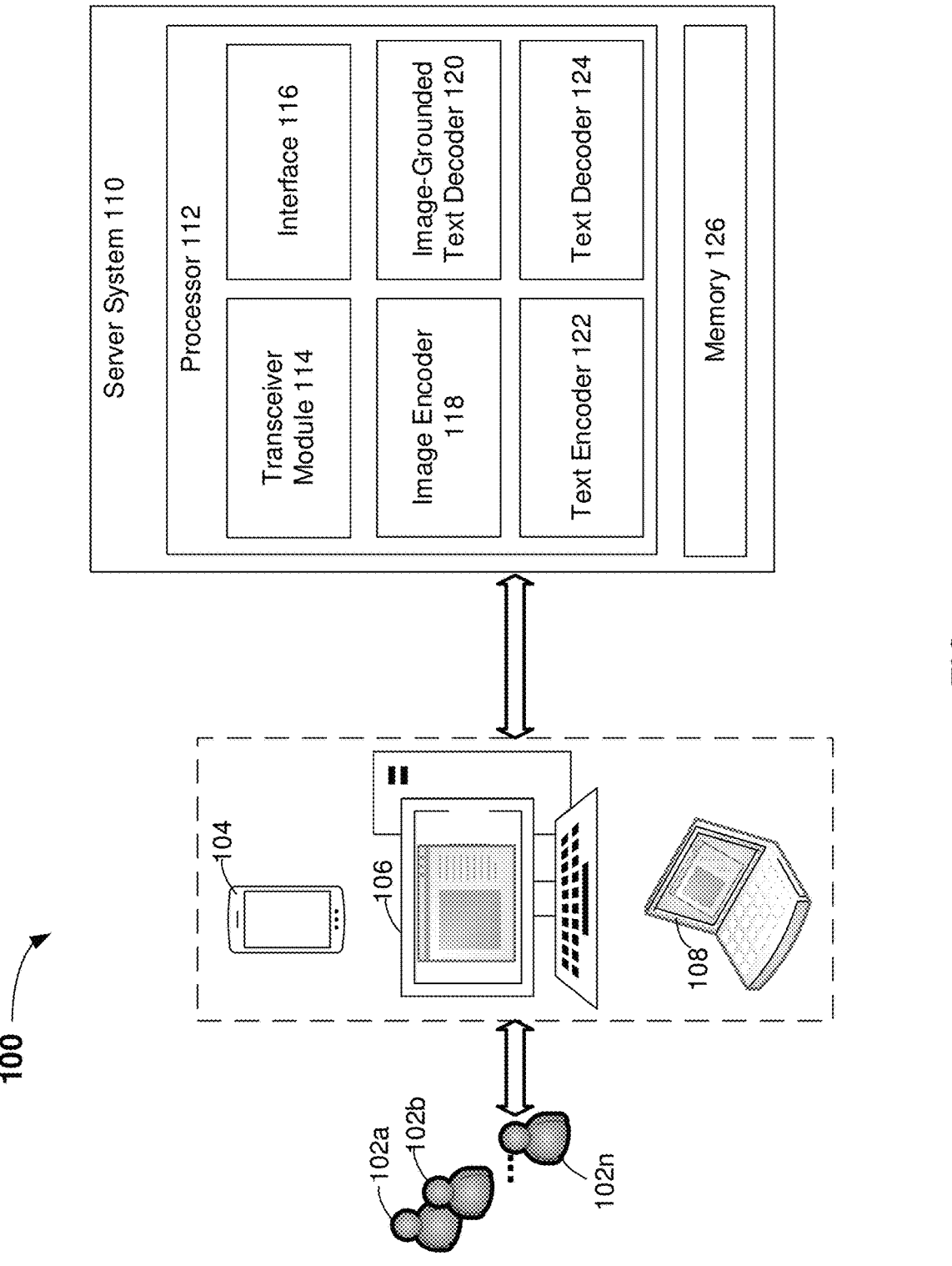
FIG. 1 illustrates a diagram of an image-based system configured to identify industrial ergonomics risks and their solutions, according to an exemplary aspect of the present disclosure.

Various aspects of invention will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

In accordance with certain aspects, the present disclosure relates to automatically identifying root causes of ergonomic risks at various industrial settings and determining corresponding solutions to address these risks solely from images. In one embodiment, a system may be configured to apply image captioning for an automated identification of root causes of ergonomic risks and their corresponding solutions. As will be described fully below, from an input image, a deep learning (DL) based image captioning model may be configured to identify at least one ergonomic risk, determine the root cause of the ergonomic risk, and its corresponding solution, followed by a generation of a caption including one sentence for the identified root cause and the other sentence for the ergonomic solution.

Using only workplace images, the present disclosure advantageously identifies and determines the root cause of ergonomic risks associated with various working tasks and addresses these risks without the need for costly and limited ergonomic expertise or training programs, thereby leading to a significant reduction in workplace ergonomic risks. The potential cost savings by the disclosed aspects of the present disclosure are also substantial, including reduced healthcare expenses and fewer worker compensation claims. Among other features, the present disclosure provides an easier identification of the root causes of ergonomic risks and their solutions using an ordinary camera, reducing significant efforts from ergonomic experts, to prevent potential WMSDs.

In one important aspect, the present disclosure relates to image captioning techniques which combine advanced computer vision techniques with natural language processing techniques for generating a text description from an input image using DL-based generative models. As will be described fully below, such DL-based image captioning may be configured to capture multiple objects, their attributes and relationships, minute details, and contextual information from an input image. This comprehensive understanding of the input image can be particularly crucial in identifying the root cause(s) of ergonomic risks, because it involves an understanding of multiple aspects in an image, such as workers' tasks and surrounding workplace conditions (e.g., tools used), as well as a specific ergonomic risk factor that is being exposed (e.g., awkward posture).

In one embodiment, the present disclosure may utilize pre-trained vision-language models (VLMs) for image captioning due to their remarkable cross-modal understanding performance. Cross-modal understanding enables VLMs to learn not only the relationship among visual features in the image and semantic features in the text, but also the relationships among semantic features. Cross-modal understanding is crucial for identifying the root cause(s) of ergonomic risks because it allows the VLMs of the present disclosure to understand the relationship between visual features (e.g., body part(s) of a worker in an image) and semantic features (e.g., back bending during a working activity), as well as that between multiple semantic features (e.g., back bending and back injuries).

Moreover, the present disclosure may utilize a Bootstrapping Language-Image Pre-training (BLIP) model. To determine the cohesiveness between the sentence describing the root cause of the ergonomic risk and the sentence describing its corresponding solution, the present disclosure integrates bidirectional and auto-regressive transformers (BART) which is a language model for sequence-to-sequence conversion. As a result, a root cause sentence is converted into an ergonomic solution sentence, similar to machine translation, where a sentence in one language is automatically translated into a sentence in another language.

Referring to FIG. 1, in accordance with aspects of the present disclosure, a system 100 deployed within a server-based computing environment and communication network may be configured to provide relevant stakeholders 102*a*, 102*b* . . . 102*n* (e.g., employers, safety professionals, etc.) with an automated identification of root causes of ergonomics risks and their corresponding solutions solely based on obtained images of workers performing various work tasks in any industrial setup. In one embodiment, an application, which may be a mobile or web-based application (e.g., native iOS or Android Apps), is downloaded and installed on a selected computing device or system 104, 106, or 108 for obtaining at least one image of a worker performing a work task. Computing device 104, 106, or 108 hosting the mobile or web-based application may be configured to connect, using a suitable communication protocol and network, to a server system 110, which may be configured to process the at least one image, use a DL-based image captioning model to identify the root cause of an ergonomics risk and its corresponding solution, and generate a caption of the at least one image including a first sentence relating to an identified root cause and a second sentence relating to an ergonomic solution to the identified root cause. The term "server" generally refers to a computing device or system, including processing hardware and process space(s), an associated storage medium such as a memory device or database, and, in some instances, at least one database application as is well known in the art. It should also be understood that "server system" and "server" are often used interchangeably herein.

Figure 2:
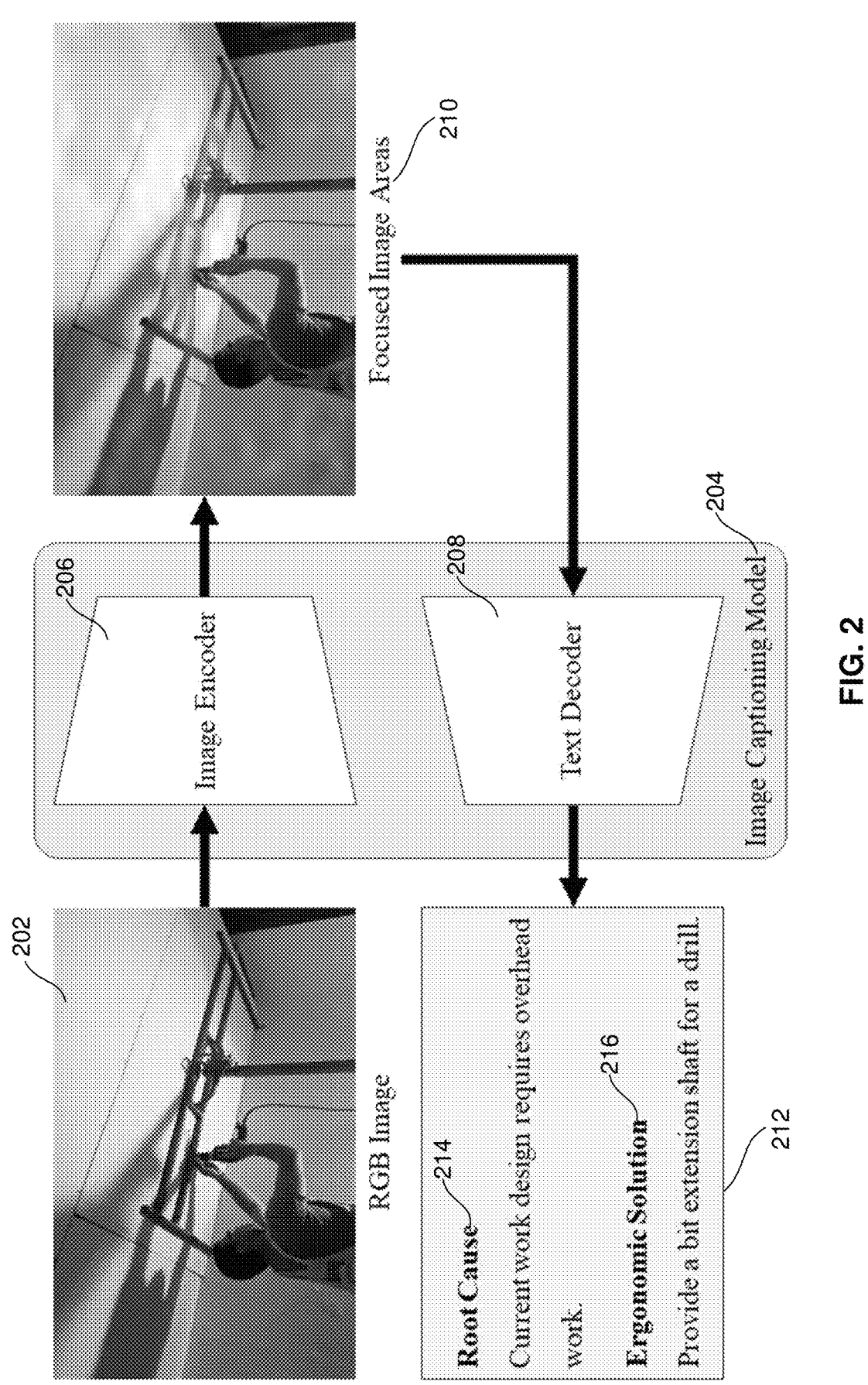
FIG. 2 illustrates an overview of the system of FIG. 1 configured to process an input image to generate a root cause of an ergonomic risk and its corresponding solution using an encoder-decoder image captioning model, according to an exemplary aspect.

Referring to FIGS. 1 and 2, one of the users 102*a*, 102*b* . . . 102*n* of FIG. 1 may obtain at least one image (e.g., a red, green and blue (RGB) image 202) of a worker performing an overhead assembly installation activity via an ordinary camera. In one embodiment, a user-facing application of the system 100 may include a plurality of modules executed and controlled by the processor of the hosting computing device or system 104, 106, or 108 for obtaining such images. For example, an image receiving/communication interface module (not shown) of the user-facing application may prompt the user of the system 100 to directly obtain an image of a worker performing a work task via the hosting computing device or system 104, 106, or 108. In another example, the image receiving/communication interface module may be configured to receive one or more images via, e.g., a universal serial bus (USB) connector (e.g., USB-A, USB-B, USB-B Mini, USB-B Micro, USB-C, USB4, Lightning) or any suitable ports or connectors, from external sources (e.g., any suitable image file storage devices or image players such as CD/DVD disc players, digital cameras and sensors, web cameras, or any suitable computing devices and imaging devices with image capturing capabilities). Further, the user-facing application may use a control module (e.g., a processor/microprocessor of the hosting computing device or system 104, 106, or 108) to identify the file format of the received image and determine whether the image is eligible for further processing and storage by the server system 110. In certain implementations, the system 100 may be configured to perform appropriate image processing (e.g., via one of the computing device 104, 106, 108, or the server system 110, or other connected computing devices/systems) to adjust the format, resolution, gradation, and image size of the received image. For example, by transmitting image data in a standardized, universal data format, such as joint photographic experts group (JPEG or JPG) or portal document format (PDF), the image data can be utilized among different computing devices, thereby maintaining data quality and data transmission/receipt efficiency.

As shown in FIG. 2, the RGB image 202 may be input into an image encoder 206 of an image captioning model 204 used by the server system 110 to identify and extract global visual features highlighting one or multiple specific image areas from the input image 202 which are subsequently transmitted to a text decoder 208 of the image captioning model 204. It should be appreciated that each of the image encoder 206 and the text decode 208 may include multiple components and modules depending upon specific implementations of the system 100. As will be described fully below, the model 204 is a DL-based image captioning model configured to identify the root cause of at least one ergonomics risk and its corresponding solution. For example, as shown in FIG. 2, the text decoder 208 may generate a caption 212 of the RGB image 202 including a first sentence relating to an identified root cause 214 (e.g., "Root Cause: current work design requires overhead work.") and a second sentence relating to the ergonomic solution 216 (e.g., "Ergonomic Solution: Provide a bit extension shaft for a drill.").

Referring back to FIG. 1, the server system 110 may include at least one processor 112 configured to control and execute a plurality of modules including a transceiver module 114, an interface 116, an image encoder 118, an image-grounded text decoder 120, a text encoder 122, and a text decoder 124. The term "module," "encoder," and "decoder" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special purpose device. A "module," "encoder," and "decoder" may also be implemented as a combination of the two, with certain functions facilitated by hardware alone, and other functions facilitated by a combination of hardware and software. Each "module," "encoder," and "decoder" may be realized in a variety of suitable configurations, and should not be limited to any example implementation exemplified herein.

Memory 126, which is coupled to the processor 112, may be configured to store at least a portion of information obtained by the server system 110. In one aspect, memory 126 may be a non-transitory machine readable medium configured to store at least one set of data structures or instructions (e.g., software) embodying or utilized by at least one of the techniques or functions described herein. It should be appreciated that the term "non-transitory machine readable medium" may include a single medium or multiple media (e.g., one or more caches) configured to store the at least one instruction. The term "machine readable medium" may include any medium that is capable of storing, encoding, or carrying instructions for execution by all modules of the server system 110 and that cause these modules to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The transceiver module 114 of the server system 110 may be configured by the processor 112 to exchange various information and data with other modules and/or computing devices connected with the server system 110. The interface 116 may be configured to allow a user to control and access different modules and computing devices connected with the system 110. Various information relating to the control and the processing of data may be presented to the user via the interface 116 which may include any suitable graphical user interface, command line interface, menu-driven user interface, touch user interface, voice user interface, form-based user interface, natural language user interface, and mobile user interface (e.g., graphical and touch-sensitive display features associated with mobile computing devices such as smartphones and tables).

Figure 3:
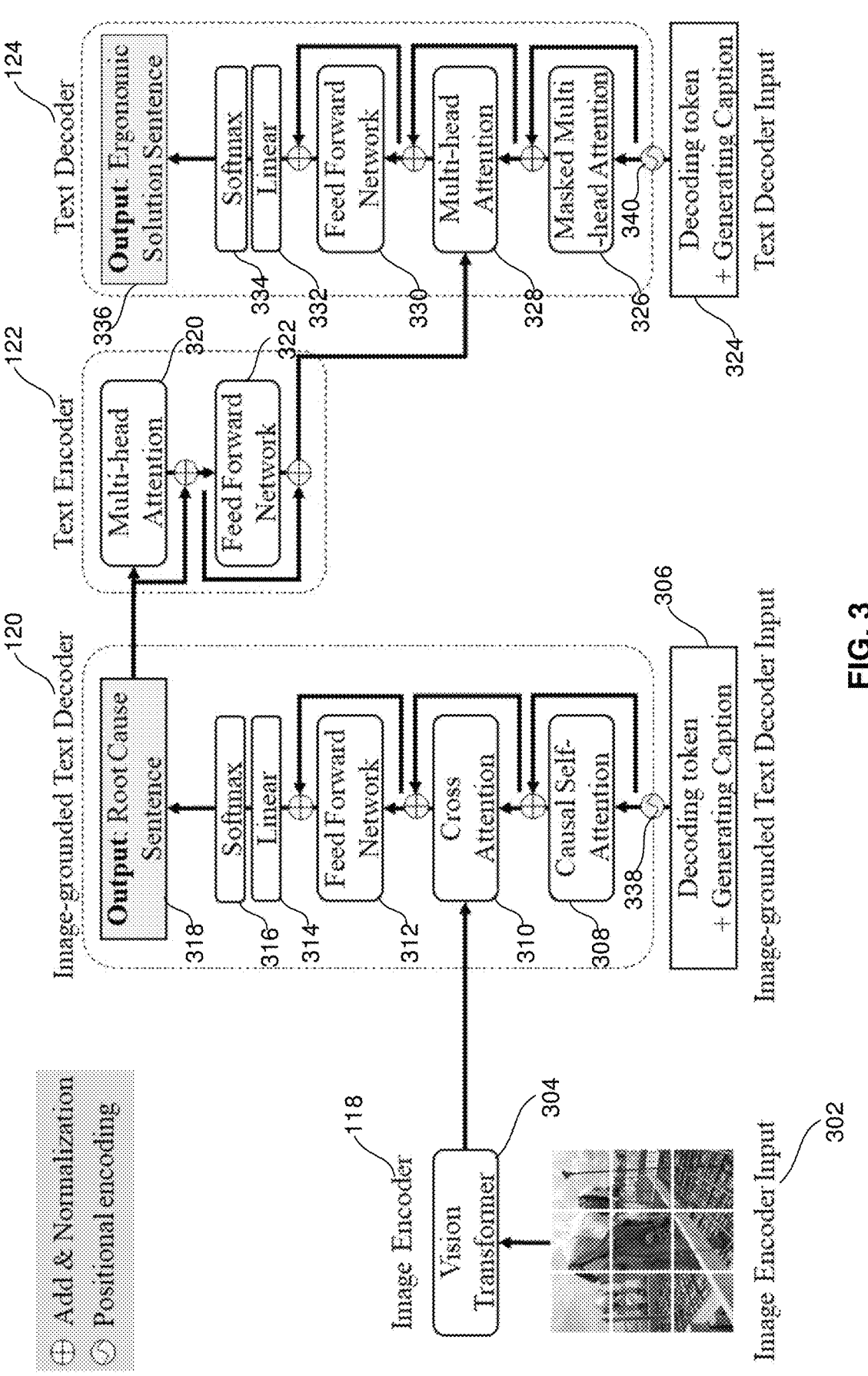
FIG. 3 illustrates an example architecture of the encoder-decoder image captioning model of FIG. 2, according to an exemplary aspect.

Referring to FIGS. 1 and 3, in one aspect, the transceiver module 114 receives an image 302 relating to a worker performing a work task from one of the computing devices 104, 106, or 108 and inputs the image into a vision transformer 304 of the image encoder 118, where the image 302 is divided into a grid of patches (a plurality of sub-images). In this example, the input image 302 is partitioned into 9 patches that are then encoded as a sequence of embeddings, which represent a global image feature. The image encoder 118 may generate an embedding vector from an input representation sequence based on the input image 302 and transmit it to a decoder (e.g., the image-grounded text decoder 120) to generate an output sequence. Prior to generating an output at each step, the embedding vector may be input into the decoder and hence the model of the present disclosure is auto-regressive.

Additionally, a decoding token 306—a signal for instructing the image-grounded text decoder 120 to initiate output generation—and any tokens for a root cause sentence may be generated and inputted to the causal self-attention layers 308 in the image-grounded text decoder 120. An attention function generally maps a query and a set of key-value pairs to an output, where the query, keys, values, and output are all vectors. The output is computed as a weighted sum of the values, where the weight assigned to each value is computed by a compatibility function of the query with the corresponding key. This step identifies relative sensitivity scores amongst tokens in an input text. Herein, a token refers to a single unit of text that language models deploy for processing, which can be individual words or sub-words. Self-attention layers generally provide an effective way to capture dependencies in sequential data by assigning different importance weights to different steps in an input sequence, enabling the model to focus on the most relevant parts of the input for making predictions. Causal self-attention layers 308, which are based on the self-attention layers, utilize a masking technique to ensure that the prediction for a given token is influenced by earlier tokens in the input sequence. This masking process is essential for auto-regressive prediction, where each output token is predicted based on the preceding tokens, thus enabling the model to generate contextually relevant text sequences in a forward direction.

The next cross-attention layers 310 may be configured to compute relative sensitivity scores between the image feature and generated tokens. All these scores may be added, normalized, and then passed into a plurality of feed-forward networks 312, followed by a linear transformation 314 and a SoftMax layer 316. That is, the attention mechanism of the present disclosure calculates a dot product of each query and key pair which yields a single number that represents a match between the query and key. This is done for all query-key pairs. The scores are then scaled by dividing them by the square root of the dimensionality of the query/key vectors in order to prevent the dot product from growing too large as the dimensionality increases. Next, a SoftMax function is applied by the SoftMax layer 316 to these scaled scores for each query to ensure that the scores are positive and sum to one. This makes them usable as weights in a weighted sum. In one embodiment, the output of the image-grounded text decoder 120 includes the probability of the next token for the root cause sentence given the input image 302 and earlier generated tokens, and the next token is decided by the maximum probability. These generated tokens will be a sentence 318 describing the root cause of an ergonomic risk.

Furthermore, these generated tokens become an input to the text encoder 122 even if they are not a complete sentence. In one embodiment, this input may be processed by multi-head attention layers 320 of the text encoder 122, which calculate relative sensitivity scores among tokens of the input, followed by feed-forward networks 322. Multi-head attention allows the model of the present disclosure to jointly attend to information from different representation subspaces at different positions. Multi-head attention applies attention mechanism multiple times in parallel (parallel applications are referred to as "heads), such that the model of the present disclosure can capture different types of relationships in the input data. Each attention head may have its own learned linear transformations that it applies to the input embeddings to get its queries, keys, and values. Because these transformations are learned separately, each head may potentially learn to focus on different things. In the context of natural language processing, one head may focus on syntactic relationships (e.g., subject-verb agreement), while another head may focus on semantic relationships (e.g., word synonymy or thematic roles). The outputs from all heads may be concatenated and linearly transformed to form a final output of each multi-head attention layer, such that different types of information captured by each head may be combined to form a unified representation. By using multiple heads, the model of the present disclosure achieves a more complex and nuanced understanding of an input image.

Simultaneously, another decoding token 324 and any tokens generated for an ergonomic solution sentence may be input into masked multi-head attention layers 326, which serve a similar role to that of the causal self-attention layer 308. Subsequently, the multi-head attention layers 328 may identify relative sensitivity scores between the generated tokens for an ergonomic solution sentence and those for the root cause sentence. Similar to the end of the image-grounded text decoder 120, the output of the multi-head attention layers 328 may convert into the next token using the feed-forward networks 330, linear transformation 332, and the SoftMax layer 334 in order to generate a sentence describing an ergonomic solution 336. During the process of predicting the next tokens for sentences of both the root cause and the ergonomic solution, the model of the present disclosure may be trained with the following loss function.

$$\mathcal{L} = -\sum_{t_p=1}^{T_p}\sum_{v_p=1}^{V_p} y'_{tp,vp} \log p\left(c \mid C_{<t_p}, I\right) - \tag{1}$$

$$\sum_{t_s=1}^{T_s}\sum_{v_s=1}^{V_s} y'_{ts,vs} \log p\left(d \mid D_{<t_s}, C_{<t_p}\right)$$

$$y'_{tp,vp} = \begin{cases} (1-\varepsilon) & \text{if } t_p = v_p \\ \dfrac{\varepsilon}{V_p - 1} & \text{otherwise} \end{cases} \tag{2}$$

In one aspect, the loss function may include the sum of two cross-entropy loss functions. Given one image and one caption pair, $T_p$ is the total number of tokens in a root cause sentence; $V_p$ is the vocabulary size for all root cause sentences in a training dataset; c is a target token within a root cause sentence; $C_{<t_p}$ is a set of tokens generated until $t_p$ token; I is the input image; p(·) is the probability distribution over the vocabulary; $y_{t_p,v_p}'$, is a label smoothing term; $\varepsilon$ is a label smoothing factor (=0.1 as an example) to prevent overfitting. $T_s,V_s,d,D_{<t_s}$, and $y_{t_s,v_s}'$, can be defined in an identical way to $T_p,V_p,c,C_{<t_p}$, and $y_{t_p,v_p}'$, respectively, but replacing the root cause with the ergonomic solution. Consequently, this loss function guides the server system 110 to identify the root cause of an ergonomic risk from an image, and then to identify an ergonomic solution from the identified root cause during model training.

Moreover, in order for the model of the present disclosure to make use of the order of the sequence, certain information about the relative or absolute position of the tokens in the sequence may be utilized. For example, positional encodings 338 and 340 to the input embeddings may be used at the bottom of the image-grounded text decoder 120 and text decoder 124, respectively. In one aspect, the positional encodings 338 and 340 may be learned or fixed.

In an alternate embodiment, referring to FIG. 1, one of the computing device 104, 106, or 108 hosting the mobile or web-based application may be configured to connect, using a suitable communication protocol and network, with the server system 110 which may be Cloud-based. Here, a communication network may generally include a geographically distributed collection of computing devices or data points interconnected by communication links and segments for transporting signals and data therebetween. Communication protocol(s) may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the system 100 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

The mobile or web-based application may be a thin client device/terminal/application deployed within the system 100 and may be configured to perform certain preliminary processing of image data relating to workers performing various tasks. Thereafter, the image data may be transmitted to the Cloud-based server system 110 for further processing, as described above. In one embodiment, such an application may be configured to make one or more an application programming interface (API) calls through an API interface. For example, the server system 110 may include an API gateway device (not shown) configured to receive and process API calls from various connected computing devices deployed within the system 100 (e.g., an operating system, a library, a device driver, an API, an application program, software or other module). Such an API gateway device may specify one or more functions, methods, classes, objects, protocols, data structures, formats and/or other features of the server system 110 that may be used by the mobile or web-based application. For example, the API interface may define at least one calling convention that specifies how a function associated with the server system 110 receives data and parameters from a requesting device/system and how the function returns a result to the requesting device/system. According to one embodiment, in response to detecting that the mobile or web-based application makes an API call through the API interface to encode and decode an image relating to a worker performing a work task, the server system 110 may return a caption of the image including a first sentence relating to an identified root cause and a second sentence relating to an ergonomic solution through the API interface to the application, as shown in FIG. 2. It should be appreciated that the server system 110 may include additional functions, methods, classes, data structures, and/or other features that are not specified through the API interface and are not available to a requesting computing device.

The server system 110 may provide functionalities for any connected devices such as sharing data or provisioning resources among multiple client devices, or performing computations for each connected client device. Within a Cloud-based computing architecture, the server system 110 may be configured to provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, CPUs, GPUs, random access memory, caches, etc.), and storage devices (e.g., network attached storages, storage area network devices, hard disk drives, solid-state devices, etc.).

In addition, such resources may be used to support virtual networks, virtual machines, databases, applications, etc. The term "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), eXtendible markup language (XML), TEXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible using any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

The server system 110 (e.g., Cloud-based or an on-site server) of the present disclosure may be configured to connect with various data sources or services (not shown). In one embodiment, the server system 110 may be configured to access a database or dataset of likely root-causes for identified ergonomics risks based on thousands of ergonomics assessments performed by ergonomics experts. One of the data sources or services may also comprise a database or dataset of various ergonomic risk control options. For another example, one of the data sources or services may comprise an artificial intelligence based diagnostic system or an expert or knowledge based diagnostic or evaluation system for providing or optimizing recommendations that may include text, audio, video, and other rich media explanations.

In accordance with further aspects of the present disclosure, a custom dataset may be developed to train and test e.g., the image captioning model 204 of FIG. 2, to determine whether the system 100 accurately identifies the root causes of ergonomic risks and their solutions, as ergonomic experts prescribe. In one embodiment, a similarity-based evaluation metric may be used by the system 100 of the present disclosure to compare the ground-truth captions and captions generated by the server system 110.

Before collecting image-caption data showing the root causes of ergonomic risks and their solutions, the server system 110 may be configured to collect samples of image-caption data showing the ergonomic problems and their solutions for a preliminary study. The root causes of ergonomic risks focus on surrounding working conditions, whereas ergonomic problems focus on workers' tasks, ergonomic risk factors, and body parts where potential WMSDs arise. Although the root cause of ergonomic risk is different from the ergonomic problem, a pilot test may be conducted within the system 100 with data regarding ergonomic problems and their solutions since both the root cause and the ergonomic problem focus on interactions between workers and surrounding work environments for providing ergonomic solutions.

The National Institute of Occupational Safety and Health (NIOSH) published an ergonomic guideline, "Simple Solutions," categorizing ergonomic solutions based on four types of construction work: simple solutions for floor and ground-level work, simple solutions for overhead work, simple solutions for lifting, holding, and handling materials, and simple solutions for hand-intensive work. The NIOSH ergonomic guideline describes ergonomic solutions and their target ergonomic problems. Out of several ergonomic solutions for each type of work specified in the NIOSH ergonomic guideline, the present disclosure selects a single solution for each type of work as the scope of the preliminary study. Within this scope, five different ergonomic problem-solution pairs may be identified in accordance with the NIOSH ergonomic guideline, as shown in FIG. 4. In some embodiments, two different ergonomic problems may have the same ergonomic solution due to different postures. For example, FIG. 4 shows that Problem-Solution Pair 1 402 identifying the ergonomic problem as "Bending forward to tie rebars at ground level can cause lower back pain," whereas Problem-Solution Pair 2 404 identifying the ergonomic problem as "Squatting for rebar tying at ground level can be painful to the knees." However, the ergonomic solutions for both pairs 402 and 404 may include "Use a rebar-tying tool with extension handle."

In one example study, FIG. 5 illustrates a number of collected images, a number of human-annotated captions, and a number of augmented images and captions. For the preliminary study, the system 100 may be configured to collect images, each depicting one of the five ergonomic problems identified in FIG. 4. A total of 2,599 images from 96 YouTube videos and 222 images from other websites (e.g., iStock). In some embodiments, since some images from the same YouTube video were consecutive and shared context information (e.g., background), using a subset of YouTube images as a testing dataset may hamper testing the generalizability of DL models of the present disclosure. Accordingly, the system 100 may obtain the images from YouTube for training and the images from other websites for testing purposes.

Furthermore, given that training DL models of the present disclosure using an imbalanced dataset may result in skewed or biased learning, both oversampling and under-sampling techniques may be applied by the present disclosure. For ergonomic problem-solution pairs with fewer than 500 training images (e.g., Problem-Solution Pairs 1 and 2 402 and 404 of FIG. 4), the system 100 may employ a cut-and-paste image augmentation method. The reason for selecting this method over traditional methods like translation, rotation, and scaling is that the traditional methods may produce highly similar images due to the sequential nature of some images and their shared context information. To implement the cut-and-paste image augmentation, in some embodiments, an additional set of 17 construction background images and extracted 20 worker foreground images may be collected from the training dataset using a background remover tool. Subsequently, the foreground images may be attached to the newly collected background images employing random placement, random scaling, and both flipped and non-flipped orientation. Finally, synthesized images with poor quality were discarded via manual review.

Figure 6:
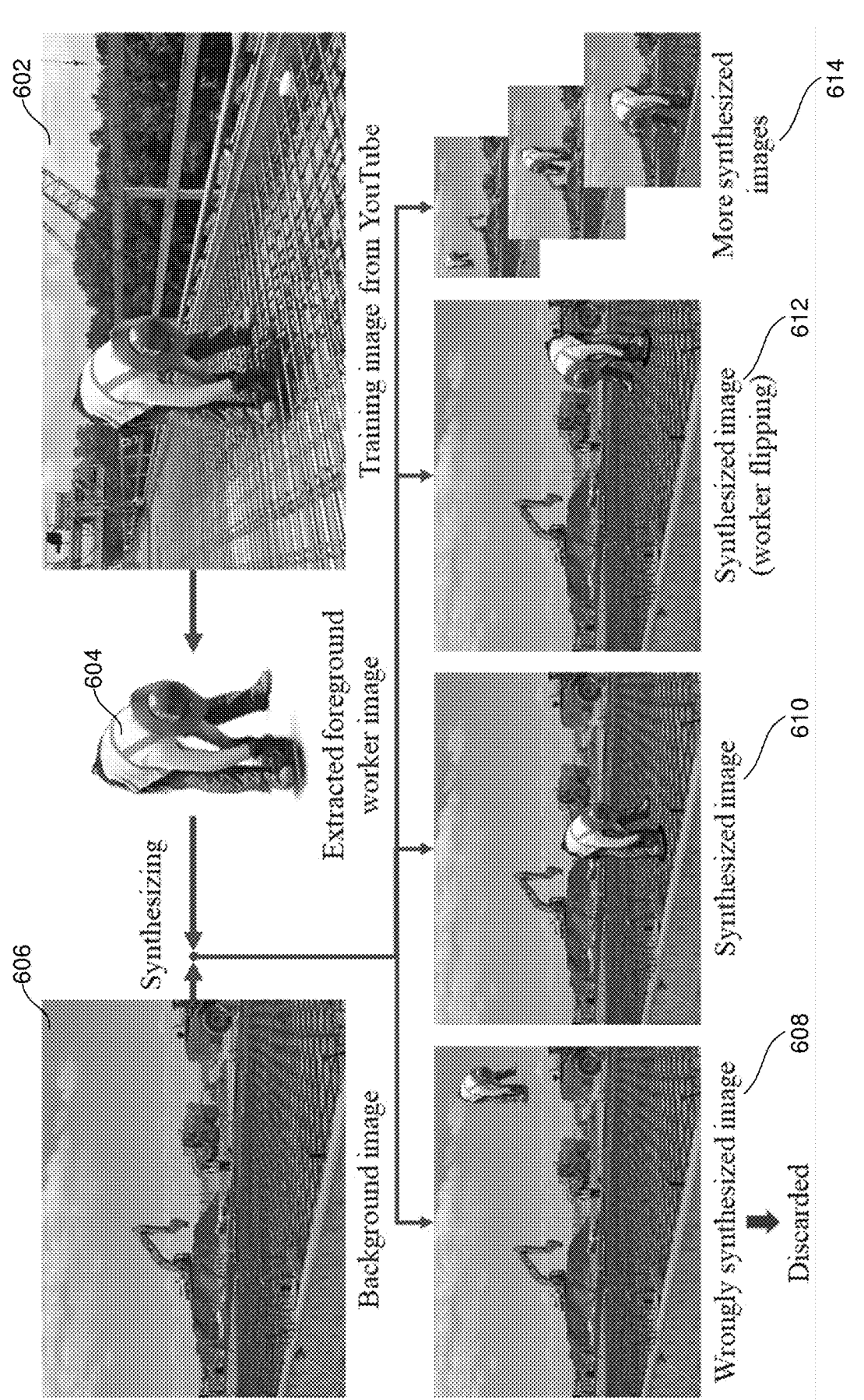
FIG. 6 illustrates a cut-and-paste image augmentation process, according to an exemplary aspect.

FIG. 6 shows the cut-and-paste image augmentation process, in accordance with aspects of the present disclosure. Initially, a training image 602 may be obtained from a YouTube video by the server system 110. A foreground worker image 604 may be extracted from the training image 602 by removing the background. Next, the foreground image 604 may be synthesized with the background image 606 to generate a number of images including wrongly synthesized image(s) 608, synthesized image(s) 610, synthesized image(s) with worker flipping 612, and more synthesized image(s) 614. The server system 110 may analyze these images and discard wrongly synthesized image(s) 608.

On the other hand, for problem-solution pairs that had over 500 training images, e.g., Problem-Solution Pairs 3, 4, and 5 of FIG. 4, random sampling may be utilized to maintain a total of 500 images per pair.

Figure 7:
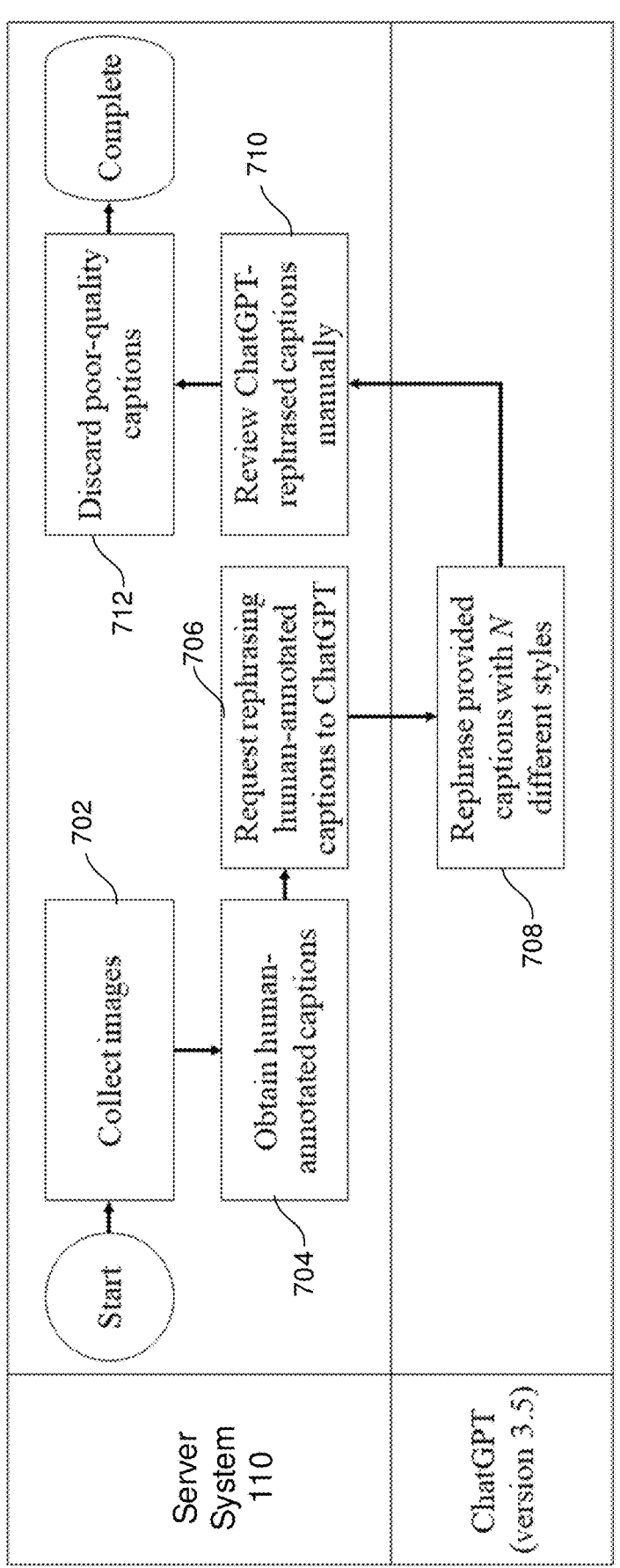
FIG. 7 illustrates a ground-truth caption preparation and augmentation process, according to an exemplary aspect.

To train an image captioning model, it is essential to obtain ample captions as well as numerous images. In accordance with aspects of the present disclosure, FIG. 7 illustrates a ground-truth caption preparation process, including caption augmentation, conducted by the server system 110, which may initially collect images from various sources 702 and obtain human-annotated captions of these images 704. In one embodiment, the server system 110 may first generate six captions per ergonomic problem-solution pair according to "Simple Solutions" of the NIOSH ergonomic guideline. In line with NIOSH's structure, each caption is composed of two sentences. The first sentence explains an ergonomic problem, whereas the second sentence describes an ergonomic solution. Subsequently, the server system 110 may augment a small set of manually crafted captions using a large language model 706, such as ChatGPT. Recently, ChatGPT has emerged as a promising tool for such augmentation, owing to its remarkable rephrasing capability without additional training. In a preferred embodiment, ChatGPT (e.g., version 3.5) may be utilized to augment human-annotated captions.

Specifically, the server system 110 may use ChatGPT to rephrase each of the human-annotated captions using multiple (e.g., 30) distinct styles 708. For example, during this process, a user of the system 100 may manually type a prompt, "Rephrase the provided sentence in 30 different styles but with the same meaning." Only sentences describing ergonomic problems may be rephrased, as ChatGPT may often change ergonomic solutions. Following a manual review of each rephrased caption 710 and removal of poor quality captions 712, a total of 811 captions for the five ergonomic problem-solution pairs were gathered. This caption augmentation process resulted in an increase in the total number of distinct words in the complete sentences of ergonomic problems, rising from 97 to 284. This shift indicated a generation of more diverse semantic information.

During training, it is essential to have an equal number of images and captions, but the collected dataset may have an uneven distribution of images and captions, as shown in FIG. 5. In some embodiments, certain captions may be used multiple times within each ergonomic problem-solution pair during training. In contrast, the number of captions may be higher than the number of images in the testing dataset since any captions generated for a testing image are considered correct if they match any one of the captions within the same ergonomic problem-solution pair. This is facilitated by the uniform meaning conveyed by all captions within the same pair. FIG. 8 summarizes an overview of the training and testing datasets used by the server system 110 of the present disclosure, in some implementations.

Figures 10, 11:
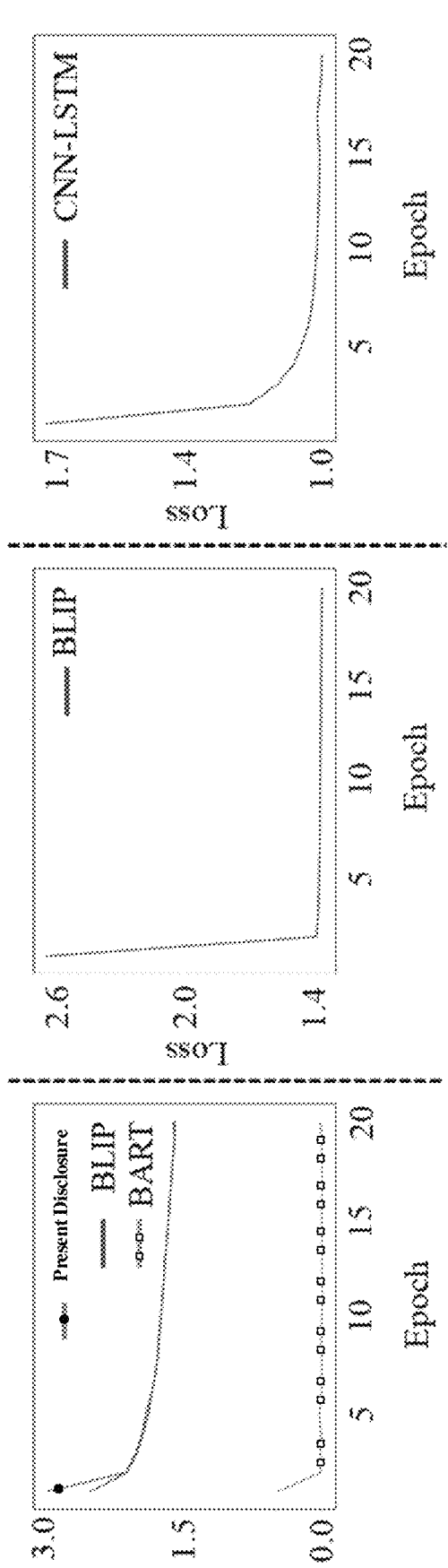
FIG. 10 illustrates training loss variation over epoch for each DL model of FIG. 9, according to an exemplary aspect.
FIG. 11 illustrates a comparison of bilingual evaluation understudy (BLEU) scores between the system of FIG. 1 and two other models, according to an exemplary aspect.
Figure 12:
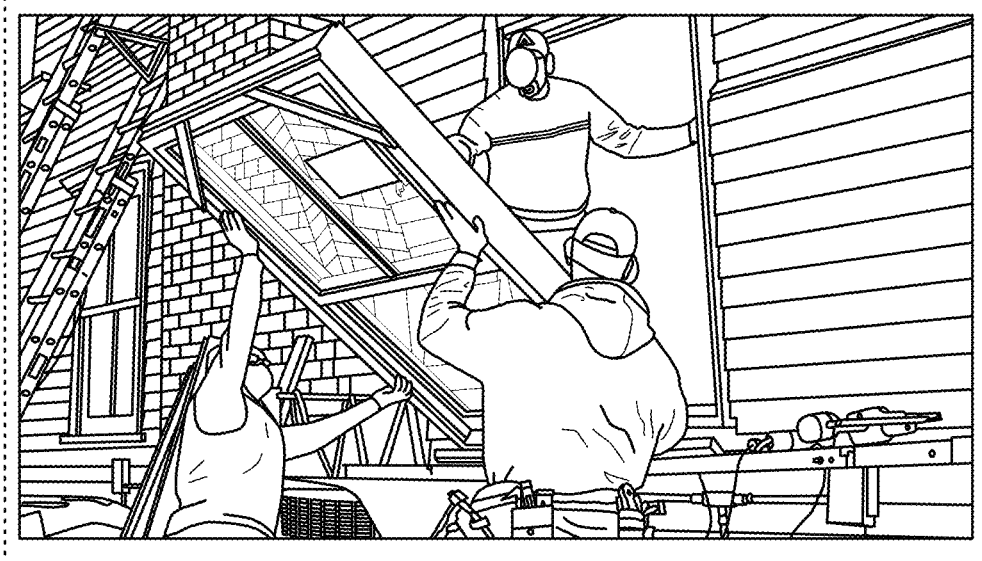
FIG. 12 illustrates a first example of ergonomic problems and solutions correctly identified by the system of FIG. 1, according to an exemplary aspect.

To demonstrate whether the ground-truth captions are more similar to the generated captions by the system 100 of the present disclosure than the generated captions by other DL architectures, two models with different architectures as the baselines may be used: a conventional convolutional neural network and long short term memory (CNN-LSTM) model and a state-of-the-art VLM, BLIP. For the CNN-LSTM model, ResNet101 may be employed as the image encoder, and a single-layer LSTM was used as the text decoder. A hyper-parameter tuning may be performed for batch size, the number of epochs, optimizer, learning rate, embedding size, hidden state size, and the image encoder pre-trained weights. The final hyper-parameter settings for all models are summarized in FIG. 9. In a preferred embodiment, pre-trained weights for all models' image encoder may be initialized using the Microsoft common objects in contexts (MS COCO) dataset. All training images may be resized to 128×128 for computational constraints. FIG. 10 illustrates the training loss variation over epoch for each DL model. Epoch in machine learning generally refers to the one entire passing of training data through an algorithm.

Next, an evaluation metric may be selected to compare the ground-truth captions with the generated captions by each DL model. The bilingual evaluation understudy (BLEU) metric, which is one of the standard evaluation metrics for image captioning, measures the similarity between model-generated captions and human-generated captions. The BLEU metric calculates precision for each n-gram, where n-grams are sets of n-consecutive words. The detailed formula is described in Eq. (3), where N is the length of n-gram, $w_n$ is a positive weight, $p_n$ is a n-gram precision.

$$BLEU = BP \cdot \exp\left(\sum_{n=1}^{N} w_n \log p_n\right) \qquad (3)$$

Generally, N ranges from 1 to 4, $w_n$ is determined by the reciprocal of N. $p_n$ is determined by counting the maximum number of times a specific n-gram of a model-generated caption appears in a ground-truth caption, and then dividing it by the total number of n-grams in the model-generated caption. BP is the brevity penalty, penalizing shorter model-generated captions.

Consequently, the BLEU metric measures the similarity of n-word sequences between model-generated captions and ground-truth captions within a range of 0 to 1. BLEU 1, BLEU 2, BLEU 3, and BLEU 4 correspond to N being 1, 2, 3, and 4, respectively. The more ground-truth captions there are to compare with a model-generated caption, the higher the BLEU score is. Moreover, considering the ground-truth captions are based on the NIOSH ergonomic guideline, the higher the BLEU score is, the higher the likelihood that a DL model accurately identifies the root causes of ergonomic risks and their solutions is.

Using the testing dataset and the BLEU score, the system 100 of the present disclosure has been assessed against the two baseline models. Although the training and testing datasets are not exactly associated with the root causes of ergonomic risks and their solutions, identifying ergonomic problems and identifying the root causes of ergonomic risks are similar in that they both require observing workers in order to understand workers and surrounding workplace conditions. FIG. 11 summarizes the BLEU scores of the present disclosure and the other two baseline models for comparison purposes. Across all scores of BLEU 1, BLEU 2, BLEU 3, and BLEU 4, the present disclosure outperformed all baseline models. As shown in FIG. 11, the present disclosure achieved a BLEU 1 score of 0.942, a BLEU 2 score of 0.886, a BLEU 3 score of 0.842, and a BLEU 4 score of 0.796. The scores of all models followed a descending pattern, with the highest score observed in BLEU 1, followed by BLEU 2, then BLEU 3, and finally the lowest score in BLEU 4. This indicates that the longer word sequences generated by DL models are compared to the ground-truth captions, the less similar they are. In addition, compared to the two VLMs (i.e., BLIP and the present disclosure), the CNN-LSTM showed the lowest BLEU scores.

Figure 13:
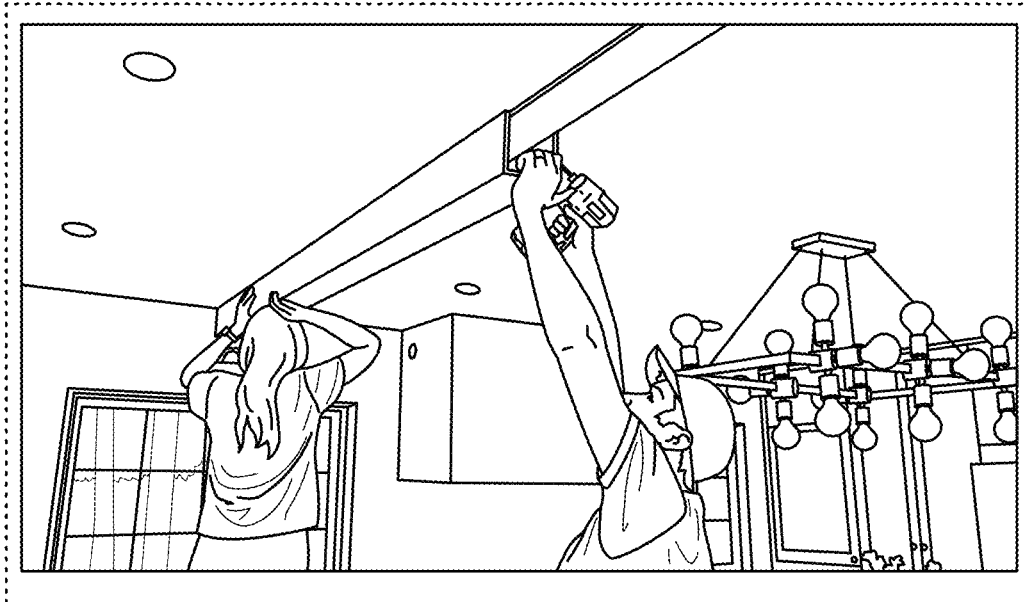
FIG. 13 illustrates a second example of ergonomic problems and solutions correctly identified by the system of FIG. 1, according to an exemplary aspect.

FIGS. 12-16 display examples of ergonomic problems and solutions correctly identified by the system 100 of the present disclosure. The first sentence of an output by the system 100 describes the ergonomic problem, and the second sentence describes the ergonomic solution. Specifically, referring to the image illustrated in FIG. 12, the identified ergonomic problem is: Holding a window that is too heavy can cause the shoulders to become damaged and strained. The corresponding ergonomic solution is: Use vacuum lifters. FIG. 13 illustrates two people performing an overhead installation activity and the identified ergonomic problem is: Raising the arms to drill overhead can be harmful to the shoulders. The corresponding ergonomic solution is: Use a bit extension shaft. Moreover, the ergonomic problem identified in the image of FIG. 14 is: Squatting to reach and tie rebars at lower levels can cause knee soreness. The corresponding ergonomic solution is: Use a rebar tying tool with extension handle. As another example, the ergonomic problem identified in the image of FIG. 15 is: The user of vibrating power tools can cause hand pain and damage for workers. The corresponding ergonomic solution is: Use reduced vibration power tools. Referring to FIG. 16, the ergonomic problem identified in the image is: Bending forward to tie rebars located near the feet may cause discomfort in the lower back. The corresponding ergonomic solution is: Use a rebar tying tool with extension handle. This solution is similar to that of FIG. 14, although different work tasks and postures are involved. In sum, the present disclosure accurately captured tasks, postures, objects, and/or body parts where potential WMSDs occur in obtained images capturing workers performing various tasks in industrial settings, as well as ergonomic solutions across all ergonomic problem-solution pairs.

In some alternate embodiments, the system 100 of the present disclosure may be configured to capture accurate pose information and recognize the root causes of ergonomic risks. For example, the system 100 may integrate with an existing vision-based ergonomic risk assessment tool. Since existing vision-based ergonomic risk assessment tools can capture 2D or 3D body joint locations and corresponding ergonomic risk scores, this integration enables the present disclosure to recognize accurate pose information, improving its performance in identifying the root causes of ergonomic risks. In addition, the present disclosure may accurately identify the root causes of ergonomic risks and their solutions based on a dataset of the root causes of ergonomic risks.

According to aspects of the present disclosure, FIG. 17 illustrates a flowchart of a method 1700 performed by the system 100 of FIG. 1 for automatically identifying root causes of industrial ergonomic risks and their corresponding solutions using advanced computer vision and natural language processing, especially solely from images. Method 1700 may comprise obtaining (1702), by a processor of a computing device deployed within a communication network, an image of a worker performing a work task; encoding (1704) the image to generate an embedding vector; and transmitting (1706) the embedding vector to an image-grounded text decoder, while generating first tokens to instruct the image-grounded text decoder to generate a first sentence indicating a root cause of an ergonomic risk identified in the image. The method 1700 further comprises computing (1708) first relative sensitivity scores relating to the first tokens and extracted image features, generating (1710) the second token of the first sentence based on the first relative sensitivity scores, while generating third tokens to instruct a text decoder to generate a second sentence indicating a solution to the ergonomic risk identified in the image, and calculating (1712) second relative sensitivity scores relating to the second and third tokens. Finally, the method 1700 comprises generating (1714) the first and second sentences based on the first and second relative sensitivity scores, and the second and third tokens.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, un-recited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A system, comprising:
a computing device including:
a non-transitory computer-readable storage medium storing machine readable instructions; and
a processor coupled to the non-transitory computer-readable storage medium and configured to execute the machine readable instructions to:
obtain an image of a worker performing a work task,
encode the image to generate an embedding vector,
incorporate a deep learning based model to process the embedding vector to generate a first sentence indicating a root cause of an ergonomic risk identified in the image and a second sentence indicating a solution to the ergonomic risk identified in the image, and
establish a dataset to train the deep learning based model by:
collecting samples of image-caption data, the image-caption data including a plurality of images and information relating to ergonomic problems identified in the plurality of images and corresponding solutions to the ergonomic problems,
categorizing the samples of image-caption data into a plurality of ergonomic problem-solution pairs,
identifying, from the samples, training images associated with each of the plurality of ergonomic problem-solution pairs,
sampling the plurality of ergonomic problem-solution pairs in connection with the training images, establishing the dataset based at least upon sampling results of the plurality of ergonomic problem-solution pairs in connection with the training images, and
training the deep learning based model using the dataset.

2. The system of claim 1, wherein the processor is configured to execute the machine readable instructions to sample the plurality of ergonomic problem-solution pairs in connection with the training images by:
oversampling a first portion of the plurality of ergonomic problem-solution pairs in response to identifying that first plurality of the training images associated with the first portion are less than a selected value; and
undersampling a second portion of the plurality of ergonomic problem-solution pairs in response to identifying that second plurality of training images associated with the second portion are greater than the selected value.

3. The system of claim 2, wherein the processor is configured to execute the machine readable instructions to sample the plurality of ergonomic problem-solution pairs in connection with the training images by:
removing background images from each of the training images; and
extracting foreground images from each of the training images.

4. The system of claim 1, wherein the processor is further configured to execute the machine readable instructions to generate multiple captions for each of the plurality of ergonomic problem-solution pairs using a large language model.

5. The system of claim 4, wherein each of the captions includes a first part describing an ergonomic problem and a second part describing an ergonomic solution.

6. The system of claim 5, wherein the processor is further configured to execute the machine readable instructions to prompt the large language model to generate the captions in a plurality of different semantic styles with the same meaning.

7. The system of claim 1, wherein the processor is further configured to execute the machine readable instructions to determine a training loss variation of the deep learning based model over a selected number of epochs.

8. A computer-implemented method performed by a computing server system, the computer-implemented method comprising:
obtaining, by a processor of the computing server system, an image of a worker performing a work task;
encoding the image to generate an embedding vector;
incorporating a deep learning based model to process the embedding vector to generate a first sentence indicating a root cause of an ergonomic risk identified in the image and a second sentence indicating a solution to the ergonomic risk identified in the image; and
establishing a dataset to train the deep learning based model by:
collecting samples of image-caption data, the image-caption data including a plurality of images and information relating to ergonomic problems identified in the plurality of images and corresponding solutions to the ergonomic problems,
categorizing the samples of image-caption data into a plurality of ergonomic problem-solution pairs,
identifying, from the samples, training images associated with each of the plurality of ergonomic problem-solution pairs, sampling the plurality of ergonomic problem-solution pairs in connection with the training images, establishing the dataset based at least upon sampling results of the plurality of ergonomic problem-solution pairs in connection with the training images, and training the deep learning based model using the dataset.

9. The computer-implemented method of claim 8, wherein the sampling the plurality of ergonomic problem-solution pairs in connection with the training images comprises:

oversampling a first portion of the plurality of ergonomic problem-solution pairs in response to identifying that first plurality of the training images associated with the first portion are less than a selected value; and undersampling a second portion of the plurality of ergonomic problem-solution pairs in response to identifying that second plurality of training images associated with the second portion are greater than the selected value.

10. The computer-implemented method of claim 9, wherein the sampling the plurality of ergonomic problem-solution pairs in connection with the training images comprises:

removing background images from each of the training images; and extracting foreground images from each of the training images.

11. The computer-implemented method of claim 8, further comprising generating multiple captions for each of the plurality of ergonomic problem-solution pairs using a large language model.

12. The computer-implemented method of claim 11, wherein each of the captions includes a first part describing an ergonomic problem and a second part describing an ergonomic solution.

13. The computer-implemented method of claim 12, wherein the captions are generated by the large language model in a plurality of different semantic styles with the same meaning.

14. The computer-implemented method of claim 8, further comprising determining a training loss variation of the deep learning based model over a selected number of epochs.

15. A non-transitory computer readable medium storing machine executable instructions for a computing server system, the machine executable instructions being configured for:

obtaining, by a processor of the computing server system, an image of a worker performing a work task;

encoding the image to generate an embedding vector;

incorporating a deep learning based model to process the embedding vector to generate a first sentence indicating a root cause of an ergonomic risk identified in the image and a second sentence indicating a solution to the ergonomic risk identified in the image; and establishing a dataset to train the deep learning based model by:

collecting samples of image-caption data, the image-caption data including a plurality of images and information relating to ergonomic problems identified in the plurality of images and corresponding solutions to the ergonomic problems, categorizing the samples of image-caption data into a plurality of ergonomic problem-solution pairs, identifying, from the samples, training images associated with each of the plurality of ergonomic problem-solution pairs, sampling the plurality of ergonomic problem-solution pairs in connection with the training images, establishing the dataset based at least upon sampling results of the plurality of ergonomic problem-solution pairs in connection with the training images, and training the deep learning based model using the dataset.

16. The non-transitory computer readable medium of claim 15, wherein the instructions for the sampling the plurality of ergonomic problem-solution pairs in connection with the training images further comprise instructions for:

oversampling a first portion of the plurality of ergonomic problem-solution pairs in response to identifying that first plurality of the training images associated with the first portion are less than a selected value; and undersampling a second portion of the plurality of ergonomic problem-solution pairs in response to identifying that second plurality of training images associated with the second portion are greater than the selected value.

17. The non-transitory computer readable medium of claim 15, wherein the instructions for the sampling the plurality of ergonomic problem-solution pairs in connection with the training images further comprise instructions for:

removing background images from each of the training images; and extracting foreground images from each of the training images.

18. The non-transitory computer readable medium of claim 15, further comprising instructions for generating multiple captions for each of the plurality of ergonomic problem-solution pairs using a large language model.

19. The non-transitory computer readable medium of claim 18, wherein each of the captions includes a first part describing an ergonomic problem and a second part describing an ergonomic solution, and the captions are generated by the large language model in a plurality of different semantic styles with the same meaning.

20. The non-transitory computer readable medium of claim 15, further comprising instructions for determining a training loss variation of the deep learning based model over a selected number of epochs.

* * * * *